(12) United States Patent
Coscarella

(10) Patent No.: US 9,863,134 B2
(45) Date of Patent: Jan. 9, 2018

(54) BACKWATER VALVE WITH CONTROL LINKAGE

(76) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 13/885,902

(22) PCT Filed: Nov. 16, 2011

(86) PCT No.: PCT/CA2011/050712
§ 371 (c)(1),
(2), (4) Date: Jun. 6, 2013

(87) PCT Pub. No.: WO2012/065269
PCT Pub. Date: May 24, 2012

(65) Prior Publication Data
US 2014/0144524 A1    May 29, 2014

(30) Foreign Application Priority Data

Nov. 16, 2010   (CA) ..................................... 2722310

(51) Int. Cl.
*F16K 31/18*   (2006.01)
*E03F 7/04*    (2006.01)
(Continued)

(52) U.S. Cl.
CPC ............... *E03F 7/04* (2013.01); *F16K 15/03* (2013.01); *F16K 15/181* (2013.01); *Y10T 137/7485* (2015.04)

(58) Field of Classification Search
CPC .. E03F 7/04; E03F 5/041; E03F 5/00–5/0411; E03F 2005/0412–2005/0418; E03F 2005/061–2005/068; E03F 5/042; E03F 5/046; E03F 5/06; Y10T 137/6004; Y10T 137/7358; Y10T 137/7387;
(Continued)

(56) References Cited

U.S. PATENT DOCUMENTS 194,676 A    8/1877   Hansen
197,838 A   12/1877   Downey
(Continued)

FOREIGN PATENT DOCUMENTS

CA   2 022 928 C   2/1992
CA   2 114 602 C   7/1995
(Continued)

OTHER PUBLICATIONS

"Adapt-A-Valve," product information, Mainline Backflow Products, Edmonton, Canada, at least as early as Apr. 12, 2009, <http://replay.web.archive.org/20090412082842/http://www.backwater-valves.com/Adapt-a-valve.html>, [retrieved Apr. 20, 2011], 3 pages.
(Continued)

*Primary Examiner* — Craig J Price
(74) *Attorney, Agent, or Firm* — Christensen O'Connor Johnson Kindness PLLC

(57) ABSTRACT

A backwater valve has a valve body, and a valve member pivotally movable about a pivot axis between an open position away from the valve body and a closed position covering the valve body. A control linkage is provided with at least one of a float or a counterweight in communication with the valve member via the control linkage to modify operation of the valve member.

9 Claims, 7 Drawing Sheets

(51) Int. Cl.
*F16K 15/03* (2006.01)
*F16K 15/18* (2006.01)

(58) Field of Classification Search
CPC ......... Y10T 137/7404; Y10T 137/7407; Y10T 137/741; Y10T 137/7485; F16K 15/03; F16K 15/181
USPC .......... 137/315.08, 424, 425, 420, 409, 423, 137/448, 418; 405/96
See application file for complete search history.

(56) References Cited

U.S. PATENT DOCUMENTS

| | | | |
|---|---|---|---|
| 199,696 A | 1/1878 | Dikeman | |
| 217,431 A | 7/1879 | Tilton | |
| 222,389 A | 12/1879 | Earle | |
| 271,644 A | 2/1883 | Lowrie | |
| 289,108 A | 11/1883 | Johnson | |
| 353,888 A | 12/1886 | Simpkins | |
| 371,085 A | 10/1887 | McGary | |
| 373,782 A | 11/1887 | McHugh | |
| 384,396 A | 6/1888 | Shepherd | |
| 384,397 A | 6/1888 | Shepherd | |
| 424,580 A | 4/1890 | Shepherd | |
| 463,286 A * | 11/1891 | Cone | 137/446 |
| 500,453 A | 6/1893 | Wright | |
| 566,110 A | 8/1896 | Wrigley | |
| 745,742 A * | 12/1903 | Taub | 137/527.4 |
| 876,066 A | 1/1908 | Klever | |
| 961,738 A | 6/1910 | Stickel | |
| 993,587 A * | 5/1911 | Dodd et al. | 137/428 |
| 1,031,567 A | 6/1912 | Miller | |
| 1,104,806 A | 7/1914 | Kahn | |
| 1,113,648 A | 10/1914 | Karlson | |
| 1,183,692 A | 5/1916 | Strout | |
| 1,205,199 A | 11/1916 | Healy | |
| 1,233,391 A | 7/1917 | Mullane | |
| 1,346,887 A | 7/1920 | Heald | |
| 1,411,402 A * | 4/1922 | Blackstone | 137/247.15 |
| 1,448,898 A | 3/1923 | Zehringer | |
| 1,464,614 A | 8/1923 | Nacey | |
| 1,552,088 A * | 9/1925 | Smith | 137/211 |
| 1,584,666 A | 5/1926 | Shockley | |
| 1,606,396 A | 11/1926 | Blom | |
| 1,612,195 A | 12/1926 | Kirchhan | |
| 1,673,619 A | 6/1928 | Culp | |
| 1,692,127 A | 11/1928 | Keon | |
| 1,770,637 A | 7/1930 | Wagner | |
| 1,795,669 A | 3/1931 | Northrop | |
| 1,861,397 A | 5/1932 | Khun | |
| 1,864,443 A | 6/1932 | Khun | |
| 1,924,498 A | 8/1933 | House | |
| 1,991,081 A * | 2/1935 | Charpier | E03F 7/04 137/412 |
| 2,001,941 A | 5/1935 | Rowe | |
| 2,013,188 A | 9/1935 | Reinhardt | |
| 2,048,088 A | 7/1936 | Wagner | |
| 2,259,128 A | 10/1941 | Egan | |
| 2,266,930 A | 12/1941 | Watson | |
| 2,290,461 A | 7/1942 | Young | |
| 2,292,509 A | 8/1942 | Carson | |
| 2,303,808 A | 12/1942 | Wolcott | |
| 2,320,457 A * | 6/1943 | Hammell | 137/423 |
| 2,431,640 A * | 11/1947 | Gordon | E03F 5/22 137/115.02 |
| 2,504,006 A | 4/1950 | Davis | |
| 2,578,076 A | 12/1951 | Kirby | |
| 2,628,056 A | 2/1953 | Fuller | |
| 2,638,178 A | 5/1953 | McRill | |
| 2,695,072 A | 11/1954 | Hauslein | |
| 2,786,542 A | 3/1957 | Orfei et al. | |
| 2,846,181 A | 8/1958 | Orelind | |
| 2,877,792 A | 3/1959 | Tybus | |
| 2,928,410 A | 3/1960 | Del Vecchio | |
| 2,999,509 A * | 9/1961 | Hankison et al. | 137/415 |
| 3,074,427 A | 1/1963 | Wheeler, Jr. | |
| 3,077,203 A * | 2/1963 | Wolsh | 137/392 |
| 3,078,867 A | 2/1963 | McGillis | |
| 3,176,707 A | 4/1965 | Wilson | |
| 3,202,165 A * | 8/1965 | Yavicoli | 137/411 |
| 3,244,194 A | 4/1966 | Henry | |
| 3,270,770 A | 9/1966 | Wilson | |
| 3,285,276 A * | 11/1966 | Schipper | 137/408 |
| 3,307,633 A | 3/1967 | Newall | |
| 3,327,732 A | 6/1967 | Deve | |
| 3,395,721 A | 8/1968 | Shibata | |
| 3,446,237 A | 5/1969 | Haley | |
| 3,448,465 A | 6/1969 | Pierce | |
| 3,538,514 A | 11/1970 | Schimert | |
| 3,565,099 A | 2/1971 | Huber | |
| 3,566,500 A | 3/1971 | Simon | |
| 3,626,148 A | 12/1971 | Woytowich | |
| 3,626,521 A | 12/1971 | Delco | |
| 3,720,225 A | 3/1973 | Wheatley, Jr. | |
| 3,726,308 A | 4/1973 | Eberhardt | |
| 3,781,920 A | 1/1974 | Browne | |
| 3,797,811 A | 3/1974 | Jullien | |
| 3,824,629 A | 7/1974 | Shiley | |
| 3,828,982 A | 8/1974 | Steigerwald | |
| 3,933,444 A | 1/1976 | Kilgore | |
| 3,948,282 A | 4/1976 | Yano | |
| 3,959,828 A | 6/1976 | Acevedo | |
| 3,974,654 A | 8/1976 | Mirto, Jr. | |
| 4,022,421 A | 5/1977 | Carlin | |
| 4,054,153 A * | 10/1977 | Guyton | 137/527.2 |
| 4,063,570 A | 12/1977 | Mitchell | |
| 4,064,902 A | 12/1977 | Swenson | |
| 4,095,615 A | 6/1978 | Ramsauer | |
| 4,117,860 A | 10/1978 | Carlin | |
| 4,266,569 A | 5/1981 | Wilson | |
| 4,311,163 A | 1/1982 | Langevin | |
| 4,314,583 A | 2/1982 | Peterson | |
| 4,324,506 A | 4/1982 | Steinke | |
| 4,391,289 A | 7/1983 | Adams | |
| 4,475,571 A | 10/1984 | Houston, Jr. | |
| 4,477,051 A | 10/1984 | Ben-Yehuda | |
| 4,503,881 A | 3/1985 | Vecchio | |
| 4,544,027 A | 10/1985 | Goldberg | |
| 4,605,031 A | 8/1986 | Gründ | |
| 4,787,103 A | 11/1988 | Endo | |
| RE32,870 E | 2/1989 | Houston, Jr. | |
| 4,844,610 A | 7/1989 | North, Jr. | |
| 4,852,605 A | 8/1989 | Gouhier | |
| 4,891,994 A | 1/1990 | Barba | |
| 4,917,147 A | 4/1990 | Jerkins | |
| 4,942,898 A | 7/1990 | Osowski | |
| 4,961,444 A | 10/1990 | Morgan | |
| 5,020,567 A | 6/1991 | Proulx | |
| 5,031,659 A | 7/1991 | Gonzales | |
| 5,123,444 A | 6/1992 | Persson | |
| 5,159,950 A * | 11/1992 | Wang | F16K 21/04 137/390 |
| 5,165,655 A | 11/1992 | Drexel | |
| 5,234,018 A | 8/1993 | Grachal | |
| 5,398,722 A | 3/1995 | Ramsey | |
| 5,398,735 A | 3/1995 | Lagache | |
| 5,406,972 A | 4/1995 | Coscarella | |
| 5,469,881 A | 11/1995 | Phan | |
| 5,622,205 A | 4/1997 | Petersen | |
| 5,669,405 A | 9/1997 | Engelmann | |
| 5,755,257 A | 5/1998 | Feucht | |
| 5,779,223 A | 7/1998 | Marbach | |
| 5,785,297 A | 7/1998 | Ha | |
| 5,794,655 A | 8/1998 | Funderburk | |
| 5,819,791 A | 10/1998 | Chronister | |
| 5,826,609 A | 10/1998 | Watts | |
| 5,894,858 A * | 4/1999 | Schlusselbauer | 137/448 |
| 5,934,313 A | 8/1999 | Brothers | |
| 5,947,152 A | 9/1999 | Martin | |
| 6,029,684 A | 2/2000 | Watts | |
| 6,068,057 A | 5/2000 | Beukema | |
| 6,125,878 A | 10/2000 | Watts | |
| 6,186,164 B1 | 2/2001 | Pfeifer | |
| 6,192,926 B1 | 2/2001 | Bueno Lopez | |

(56) References Cited

U.S. PATENT DOCUMENTS

| | | |
|---|---|---|
| 6,305,411 B1 | 10/2001 | Youssef |
| 6,318,404 B2 | 11/2001 | Coscarella |
| 6,446,665 B2 | 9/2002 | Coscarella |
| 6,499,503 B2 | 12/2002 | Coscarella |
| 6,666,277 B2 | 12/2003 | Reilly |
| 6,679,283 B1 | 1/2004 | Coscarella |
| 7,152,622 B2 | 12/2006 | Scaramucci |
| 7,942,606 B2 | 5/2011 | Schafer |
| 2001/0023706 A1 | 9/2001 | Coscarella |
| 2001/0023707 A1 | 9/2001 | Coscarella |
| 2001/0023708 A1 | 9/2001 | Coscarella |
| 2001/0035648 A1 | 11/2001 | Coscarella |
| 2004/0007265 A1 | 1/2004 | Coscarella |
| 2004/0250863 A1 | 12/2004 | Atkeson |
| 2008/0083464 A1 | 4/2008 | Shimizu |
| 2008/0128026 A1 | 6/2008 | Ringer |
| 2010/0078083 A1 | 4/2010 | Coscarella |

FOREIGN PATENT DOCUMENTS

| | | |
|---|---|---|
| CA | 2 302 455 A1 | 9/2001 |
| CA | 2 339 465 A1 | 9/2002 |
| CA | 2 344 321 A1 | 10/2002 |
| CA | 2 568 098 A1 | 4/2008 |
| CA | 2 640 496 A1 | 4/2010 |
| FR | 2 738 269 A1 | 3/1997 |
| GB | 21646 | 0/1911 |

OTHER PUBLICATIONS

"Z1091 Funnel Drain With 'P' Trap," Specification Sheet, Rev. C, C.N. No. 91546, Zurn Industries Limited, Mississauga, Canada, Oct. 30, 2003, 1 page.

Canadian Examination Search Report dated Nov. 8, 2017, issued in corresponding Canadian Application No. 2818947, filed Nov. 16, 2011, 5 pages.

* cited by examiner

BACKWATER VALVE WITH CONTROL LINKAGE

FIELD

This relates to a backwater valve used to prevent a backflow of sewage into a home.

BACKGROUND

U.S. Pat. No. 5,406,972 (Coscarella et al.) relates to a backwater valve which prevents a backflow of sewage into a home.

SUMMARY

There is provided a backwater valve, comprising a hollow valve body having an inlet and an outlet, and a valve member pivotally movable about a pivot axis between an open position away from the inlet and a closed position covering the inlet. A control linkage is provided with at least one of a float or a counterweight in communication with the valve member via the control linkage to modify operation of the valve member.

The addition of a control linkage which is independent of the valve member provides a number of advantages, whether the valve is one that is normally in the open position or normally in the closed position. For the valve member that is normally in the closed position, a counterweight can be added to the control linkage to maintain the valve member in the open position, a float can be added to the control linkage to float the valve member from the open position to the closed position or both can be added to the control linkage. For the valve member that is normally in the closed position, the sensitivity of the valve member to moving to the open position can be adjusted by adding a counterweight to the control linkage In a preferred embodiment which will hereinafter be further described, there is provided a backwater valve, comprising a valve body, and a valve member pivotally movable about a pivot axis between a normally open position away from the valve body and a closed position covering the valve body. A counterweight maintains the valve member in the normally open position. A float is in communication with the valve member by a control linkage. The float pivots the valve member between the open position and the closed position as it moves vertically.

According to another aspect, the counterweight may be connected to the float. The float may be carried toward the bottom of the counterweight, and the float may be connected to the valve member via the counterweight.

According to another aspect, the control linkage may comprise mating profiles carried by the valve member and the float.

According to another aspect, the control linkage may be a rigid linkage pivotally linked between the float and the valve member.

According to another aspect, there may be a flange on a bottom of the valve body between the float and the inlet.

During servicing and testing these is an advantage to being able to move and, preferably, lock the valve member in the closed position. This enables servicing or testing to be performed without concern about water flowing through the valve. It also allows for plumbing snakes and other devices to be inserted through the valve without the valve member interfering. Two locking mechanisms will hereinafter be described. One locking mechanism has a manual external activator that is connected to the control linkage to impart movement of the valve member to the closed position. Another locking mechanism has a movable pressure member the exerts a force upon the valve member to lock the valve member in a closed position. A manual external locking activator is provided to move the pressure member between a locking position and a release position.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
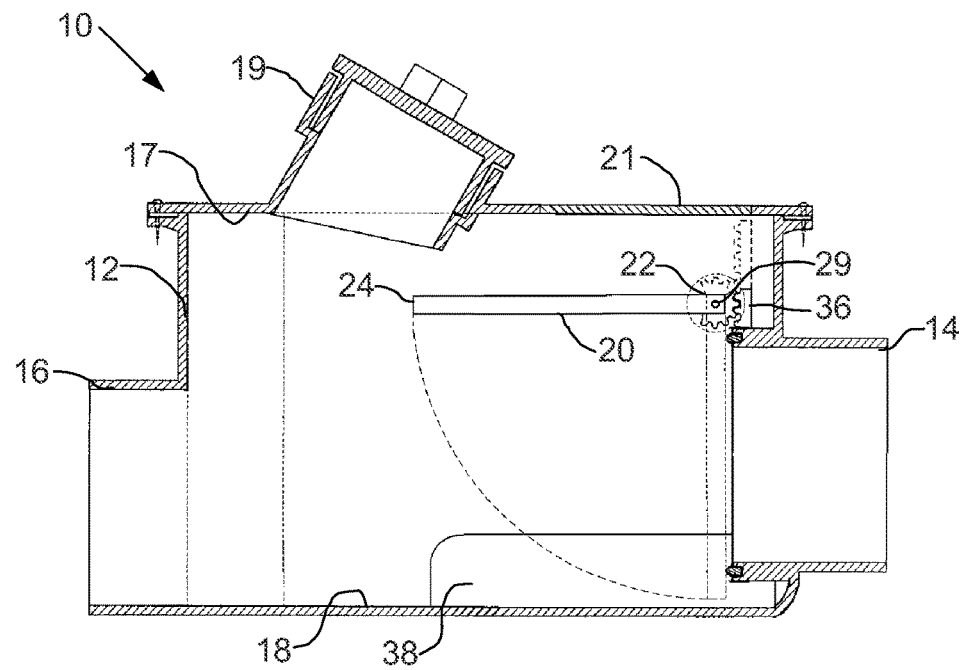
FIG. 1 is a side elevation view in section of a backwater valve.

A first embodiment of a backwater valve generally identified by reference numeral 10 will now be described with reference to FIGS. 1-7. A second embodiment of a backwater valve generally identified by reference numeral 100 will then be described with reference to FIG. 8.

Structure and Relationship of Parts:

Referring to FIG. 1, backwater valve 10 has a hollow valve body 12 having an inlet 14, an outlet 16, a top 17 and a bottom 18. A valve member 20 is pivotally movable between a normally open position (shown in solid lines) away from, or above, inlet 14, such as along top 17 of valve body 12, and a closed position covering inlet 14 (shown in broken lines). Valve body 12 preferably has a cleanout port 19 and a transparent top panel 21 to more easily observe the normal operation of backwater valve 10 without having to disassemble it.

Figure 2:
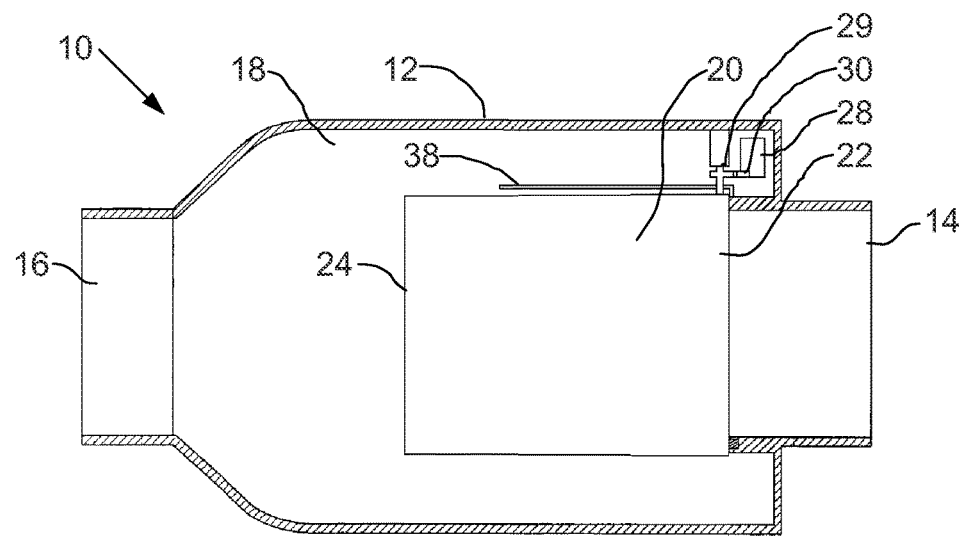
FIG. 2 is a top plan view in section of the backwater valve.
Figure 3:
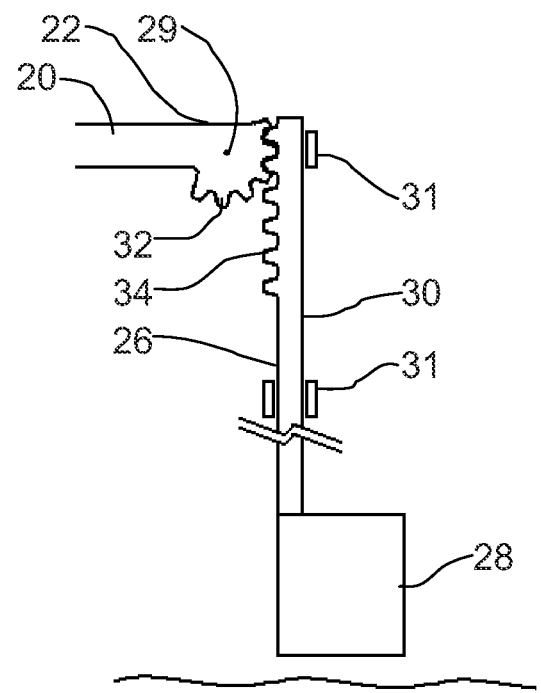
FIG. 3 is a detailed side elevation view of the float and control linkage with the valve member in the open position.
Figure 4:
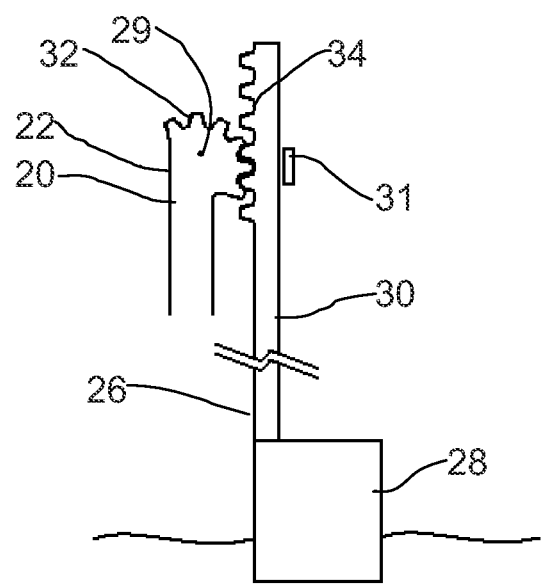
FIG. 4 is a detailed side elevation view of the float and control linkage with the valve member in the closed position.

Valve member 20 has a pivot end 22 and a remote end 24. Valve member 20 has a counterweight 26 attached to pivot end 22 that maintains valve member 20 in the normally open position. Counterweight 26 is preferably designed to be slightly heavier than what is necessary to balance valve member 20 about its pivot axis 29, in order to maintain the normally open position. Referring to FIGS. 3 and 4, a float 28 is connected to valve member 20 by a control linkage 30, such that float 28 causes valve member 20 to pivot between the open position (shown in FIG. 3) and the closed position (shown in FIG. 4) as it moves vertically. Referring to FIG. 2, while float 28 and control linkage 30 is shown on only one side, it may be preferable to have a closing force applied to either side of valve member 20. In the discussion herein, it will be understood that similar principles may be used to design such an embodiment. Control linkage 30 is movable about the pivot axis and is positioned opposite valve member 20 relative to the pivot axis 29, as shown in FIG. 3 and FIG. 4.

Figure 6:
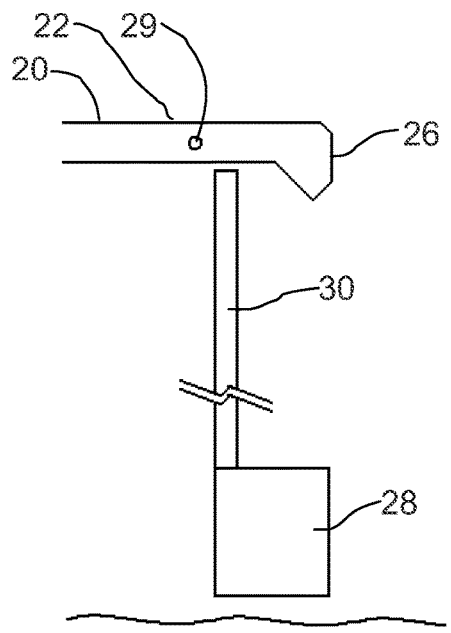
FIG. 6 is a detailed side elevation view of the float and a further alternative control linkage.

In some embodiments, the counterweight may be attached to, or integrally formed with, valve member 20 on the other side of the pivot axis 29, as shown in FIG. 6. In the embodiment depicted in FIG. 3, counterweight 26 is the connection between float 28 and valve member 20, where float 28 is carried toward the bottom of counterweight 26, and valve member 20 is engaged to the top of counterweight 26. If this weight is insufficient, or if it is desired to distribute the weight differently, counterweight 26 may be made up of various components supported in different locations, and may be carried by float 28, for example.

Figure 5:
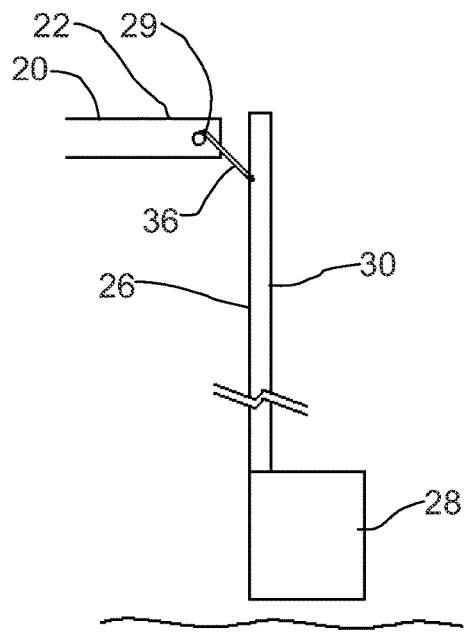
FIG. 5 is a detailed side elevation view of the float and alternative control linkage.

As depicted, control linkage 30 is a pair of mating surfaces, such as a sprocket 32 and a gear profile 34. Other mating surfaces may also be used, including surfaces that mate by friction. Other types of control linkages 30 may also be used. One example is shown in FIG. 5, and is made up of a rigid linkage 36 that is pivotally connected to counterweight 26. As float moves upward, rigid linkage 36 will cause valve member 20 to rotate closed. In another example, control linkage 30 may be an elongate flexible linkage, where tension is provided when float 28 is lowered, and released when float 28 is raised, which allows valve member 20 to close under its own weight. Alternatively, control linkage 30 may not be directly attached to valve member 20. For example, referring to FIG. 6, float 28 may be positioned below an extension of valve member 20, such that as it moves upward, float 28 pushes valve member 20 closed. In this embodiment, counterweight 26 must be carried by valve member 20. Referring to FIGS. 3 and 4, it will be understood that a guide 31 may be required to ensure the proper movement of control linkage 30 and float 28.

Figure 7:
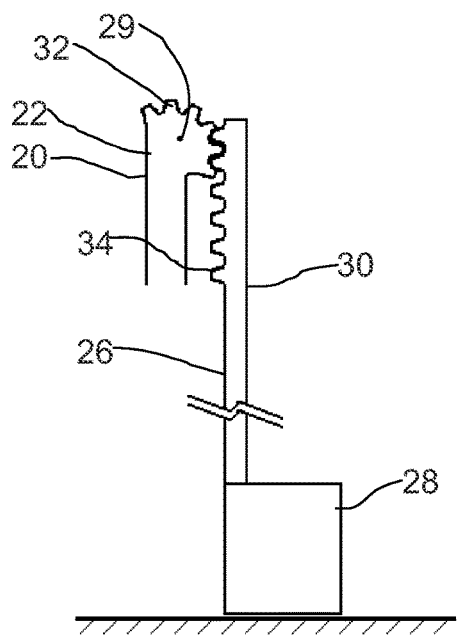
FIG. 7 is a detailed side elevation view of the control linkage locking the valve member in the closed position.

Referring to FIG. 7, one advantage of using the sprocket 32 and gear profile 34 design is the ability to lock valve member 20 in the closed position. The valve member 20 may be held closed while linkage 30 is disengaged, and re-engaged in the lowered position. Valve body 20 is no longer able to close, as linkage 30 and float 28 are unable to move downward to allow this to occur. Other designs may also be used to provide a lock for valve member 20.

The height of top 17 above inlet 14 should be sufficient to provide enough clearance for float 28 to close valve member 20. The amount of upward movement by float 28 that is necessary to close valve member 20 may be selected in the design by selecting where control linkage 30 engages valve member 20. The closer this engagement is to pivot axis 29, the less movement is required. However, as this engagement gets closer to pivot axis 29, more force is required to close valve member 20.

It is preferred to design backwater valve 10 to reopen once float 28 returns to its normal position. When control linkage 30 is attached to valve member 20, this generally occurs as a matter of course. However, when there is no attachment, other design approaches may be taken, such as by having valve member 20 carry counterweight 26, which would apply a restoring force.

Referring to FIGS. 1 and 2, backwater valve 10 may have a flange 38 that isolates float 28 from the normal flow of water through valve 10. Flange 38 is mounted on bottom 18 of valve body 12 between float 28 and inlet 14. As water flows between inlet 14 and outlet 16, flange 38 directs the majority of flow away from float 28 to prevent an unnecessary closing of valve body 20, and to also prevent debris from interfering with its normal operation. In the event of a backflow of water, water will enter outlet 16 and will not be prevented from reaching float 28 by flange 38. This will cause float 28 to rise, and close valve member 20. Alternatively, float 28 may be isolated from the normal flow of water by simply positioning it higher than the normal level of water.

Figure 8:
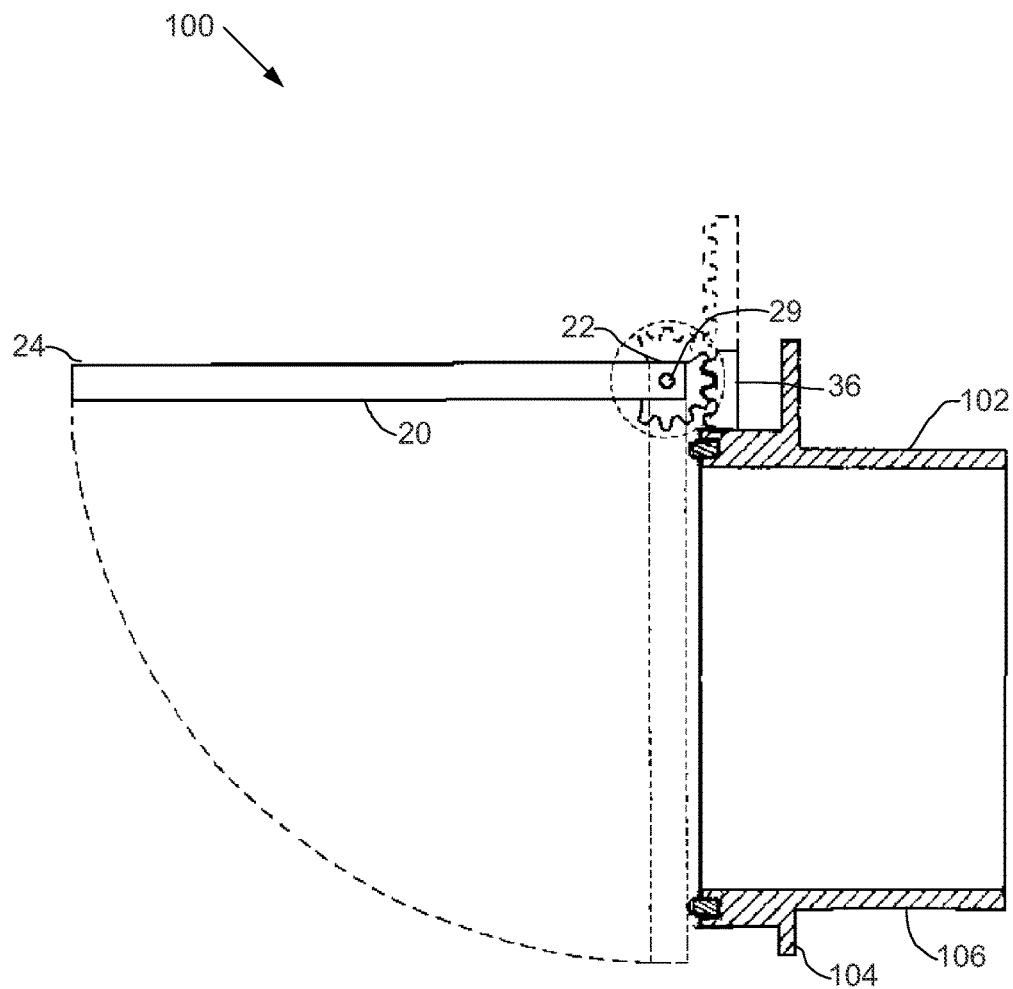
FIG. 8 is a side elevation view in section of an alternative embodiment of a backwater valve.

Referring to FIG. 8, another embodiment of a backwater valve, represented by reference numeral 100, is shown. Backwater valve 100 is intended to be installed at the end of a line, for example, at the outlet of a flow pipe into a storage tank to prevent backflow from the storage tank into the flow pipe. Backwater valve 100 has a valve body 102, and valve member 20 opens and closes as described above. The variations discussed with respect to FIGS. 1-7 are also applicable to this embodiment. Valve body 102 has a circumferential flange 104 that may be provided for convenience during manufacturing, and that may act as an installation guide. Valve body 102 also has a cylindrical flange 106 that extends outward. Cylindrical flange 106 may be used to mount to a pipe, either internally or externally. Alternatively, cylindrical flange 106 may not be present, and valve body 102 may attach directly to a tank wall using pin fasteners, adhesive, or the like.

Operation:

Referring to FIGS. 1 and 2, backwater valve 10 is installed to allow water to flow from inlet 14 to outlet 16. If the flow of water reverses to flow from outlet 16 to inlet 14, the rising fluid level will cause float 28 to lift. As float 28 lifts, control linkage 30 causes or allows valve body 20 to pivot to the closed position. Valve body 20 is held in the closed position by the upward pressure from float 28 as well as by the water pressure from outlet 16. When the water level recedes and flow out outlet 16, float 28 will move downward, and preferably allow valve member 20 to return to its normally open position as it is acted upon by the counterweight, the control linkage 30, or both.

Figure 9:
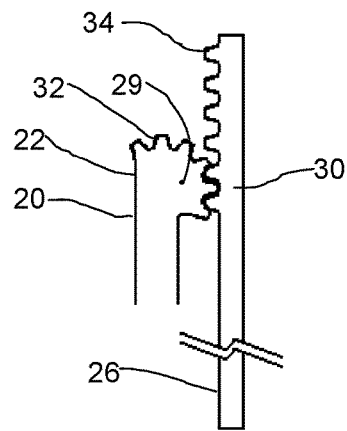
FIG. 9 is a detailed side elevation view of the control linkage for a backwater valve which is normally closed.

Variations:

Referring to FIG. 9, there is illustrated a backwater valve in which the valve member 20 is in a normally closed position. When valve member 20 is in the normally closed position, there is no need for a float and only counterweight 26 is attached to control linkage 30. Counterweight 26 serves a function of reducing a force threshold necessary to be exerted by water to move valve member 20 from the closed position to the open position, thereby increasing the sensitivity of valve member 20.

Figure 10:
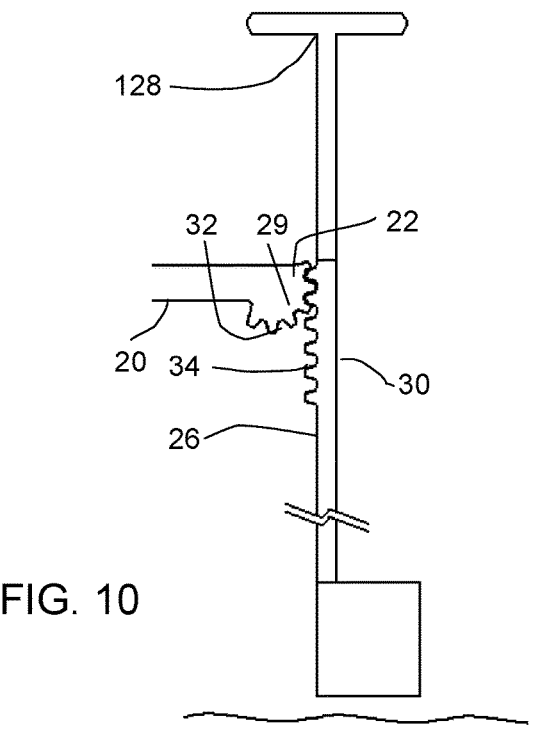
FIG. 10 is a detailed side elevation view of the control linkage for a backwater valve connected to a manual external activator that can impart movement to the valve.

Referring to FIG. 10, there is illustrated a manual external activator 128 that is connected to control linkage 30 to impart movement of valve member 20.

Figure 11:
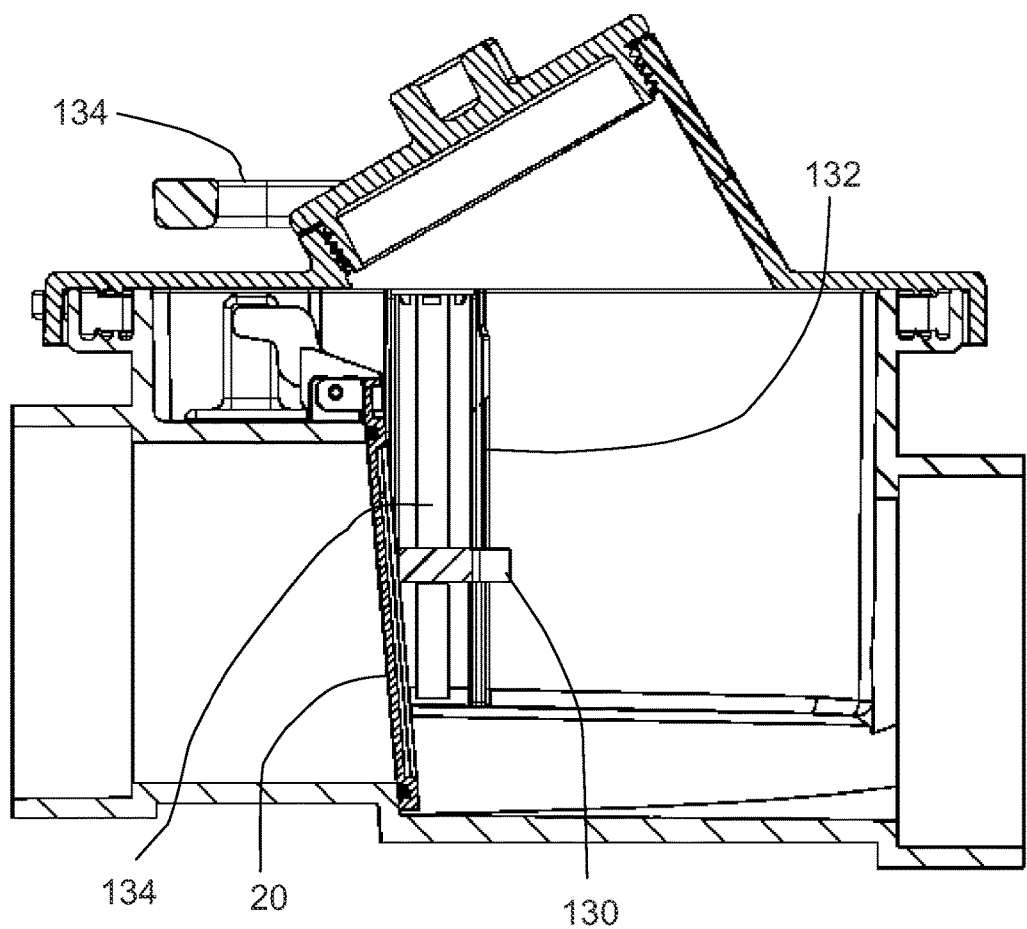
FIG. 11 is a side elevation view of a variation of the backwater valve with a locking mechanism in the locked position.
Figure 12:
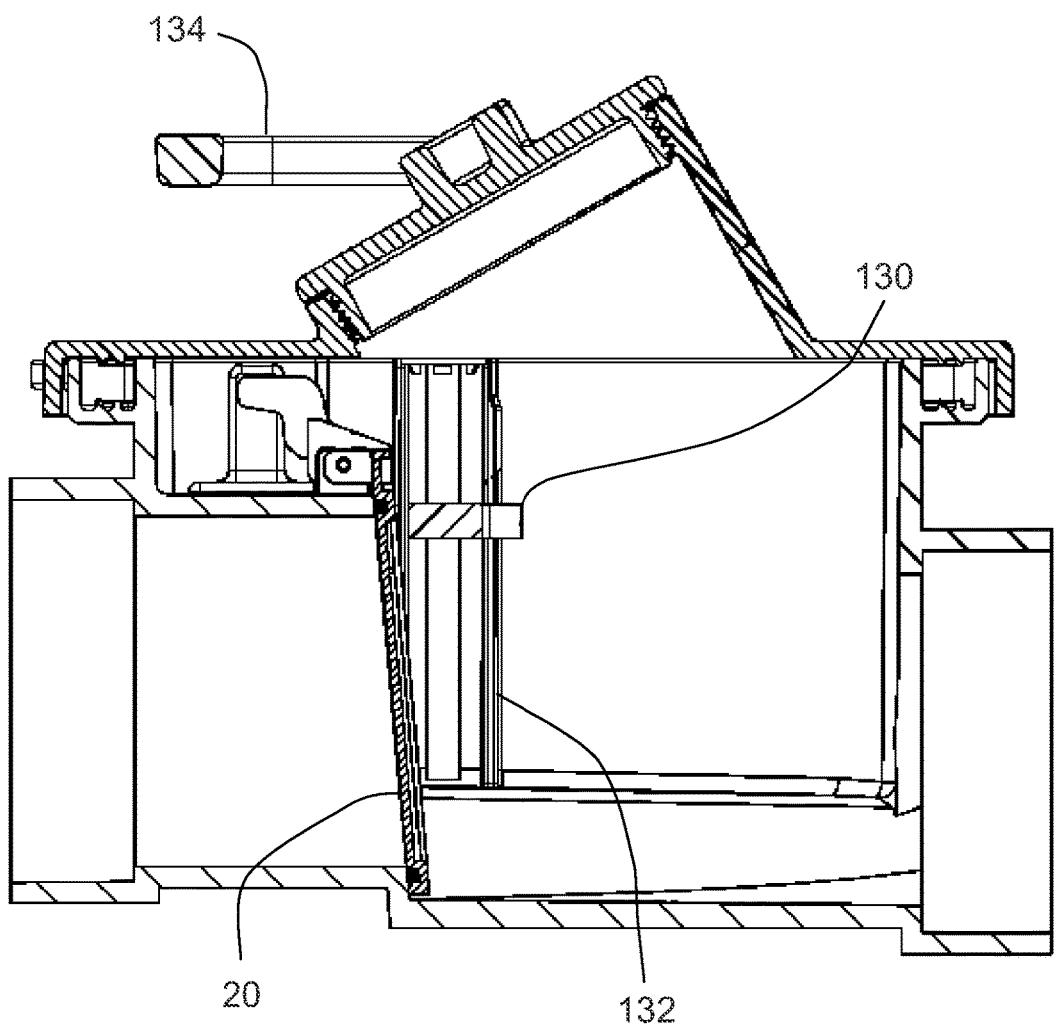
FIG. 12 is a side elevation view of the variation shown in FIG. 11 with the locking mechanism in the released position.

Referring to FIG. 11 and FIG. 12, there is illustrated a preferred locking mechanism. A movable pressure member in the form of a bar 130 slides up along a track in the form of a channel 132 parallel to valve member 20 when in the closed position. As bar 130 moves along channel 132 it exerts a force upon valve member 20 which both urges valve member 20 into the closed position and upon continued movement locks valve member 20 in the closed position. A manual external locking activator 134 is provided to move bar 130 along channel 132 between a locking position and a release position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A backwater valve, comprising:
   a hollow valve body having an inlet and an outlet;
   a valve member pivotally movable about a pivot axis between an open position in which the valve member is away from the inlet and a closed position in which the valve member directly engages and covers the inlet to prevent fluid flow through the inlet, the pivot axis being disposed above the inlet;
   a control linkage movable about the pivot axis and positioned opposite the valve member relative to the pivot axis; and
   a float and a counterweight connected to the valve member via the control linkage, at least the float being disengageable from the valve member to change an operation of the valve member from a normally open position above the inlet, in which, in response to a flow of water from the outlet toward the inlet, the valve member moves toward the closed position, to a normally closed position covering the inlet, in which, in response to a flow of water from the inlet toward the outlet, the valve member moves toward the open position, and wherein, in the normally closed position, at least the float is disengaged.

2. The backwater valve of claim 1, wherein from the normally open position, the float pivots the valve member to the closed position as the float moves vertically exerting a closing force upon the valve member via the control linkage.

3. The backwater valve of claim 2, wherein the valve member is maintained in the normally open position by the counterweight.

4. The backwater valve of claim 1, wherein a manual external activator is connected to the control linkage to impart movement of the valve member.

5. The backwater valve of claim 1, wherein the float is attached toward a bottom of the counterweight, and the float is connected to the valve member via the counterweight.

6. The backwater valve of claim 2, wherein the control linkage comprises mating profiles carried by the valve member and the float.

7. The backwater valve of claim 2, wherein the control linkage is an elongate linkage linked between the float and the valve member.

8. The backwater valve of claim 7, wherein the control linkage is flexible or rigid.

9. The backwater valve of claim 2, comprising a flange on a bottom of the valve body between the float and the inlet.

* * * * *